United States Patent
Otsubo et al.

(10) Patent No.: US 10,539,089 B2
(45) Date of Patent: Jan. 21, 2020

(54) GAS ENGINE

(71) Applicant: YANMAR CO., LTD., Osaka-shi, Osaka (JP)

(72) Inventors: Hiroyuki Otsubo, Osaka (JP); Kazuma Kishio, Osaka (JP)

(73) Assignee: YANMAR CO., LTD., Osaka (JP)

( * ) Notice: Subject to any disclaimer, the term of this patent is extended or adjusted under 35 U.S.C. 154(b) by 472 days.

(21) Appl. No.: 14/897,005

(22) PCT Filed: May 28, 2014

(86) PCT No.: PCT/JP2014/064114
§ 371 (c)(1),
(2) Date: Dec. 9, 2015

(87) PCT Pub. No.: WO2014/199828
PCT Pub. Date: Dec. 18, 2014

(65) Prior Publication Data
US 2016/0123266 A1      May 5, 2016

(30) Foreign Application Priority Data

Jun. 11, 2013   (JP) ................................. 2013-122700

(51) Int. Cl.
*F02D 41/30*      (2006.01)
*F02D 41/00*      (2006.01)
(Continued)

(52) U.S. Cl.
CPC ......... *F02D 41/30* (2013.01); *F02D 41/0027* (2013.01); *F02D 41/14* (2013.01);
(Continued)

(58) Field of Classification Search
CPC ........ F02D 2200/0611; F02D 41/0027; F02D 41/14; F02D 41/1441; F02D 41/1456; F02D 41/30; F02M 21/02
See application file for complete search history.

(56) References Cited

U.S. PATENT DOCUMENTS 4,704,997 A * 11/1987 Endo ....................... F02D 41/22
                                                                 123/198 DB
5,186,137 A *  2/1993 Salzmann ............... F01B 9/026
                                                                 123/192.2
(Continued)

FOREIGN PATENT DOCUMENTS

JP        H1-113565 A       5/1989
JP        2003-148187 A     5/2003
(Continued)

OTHER PUBLICATIONS

171221 NPL JP H01 113565 with line numbers.*

*Primary Examiner* — Carl C Staubach
(74) *Attorney, Agent, or Firm* — Norton Rose Fulbright US LLP

(57) ABSTRACT

A control unit performs perturbation using the solenoid valve under a specific engine operation condition by a standard fuel gas, by moving the solenoid valve from a predetermined opening degree to a lean side or a rich side while the A/F valve is opened at a predetermined opening degree. During an actual operation in a period in which the operation condition of the gas engine is deemed to be stable, when an output average value b obtained from an upstream oxygen sensor disposed on an exhaust passage of the gas engine deviates from an output target value a of the upstream oxygen sensor set in the control unit under the above operation condition, the control unit adjusts the opening
(Continued)

degree of the A/F valve so that the output average value b equals the output target value a.

15 Claims, 15 Drawing Sheets

(51) Int. Cl.
*F02D 41/14* (2006.01)
*F02M 21/02* (2006.01)

(52) U.S. Cl.
CPC ..... *F02D 41/1441* (2013.01); *F02D 41/1456* (2013.01); *F02M 21/02* (2013.01); *F02D 2200/0611* (2013.01)

(56) References Cited

U.S. PATENT DOCUMENTS

| | | | |
|---|---|---|---|
| 5,230,321 A * | 7/1993 | Lambert | F02B 19/12 |
| | | | 123/193.5 |
| 5,363,831 A * | 11/1994 | Tomisawa | F02D 41/1477 |
| | | | 123/695 |
| 5,657,731 A * | 8/1997 | Kim | F02D 9/102 |
| | | | 123/336 |
| 6,253,744 B1 * | 7/2001 | Saruwatari | F02D 41/004 |
| | | | 123/516 |
| 6,901,746 B2 * | 6/2005 | Nishiyama | F01N 3/0842 |
| | | | 123/568.2 |
| 8,340,926 B2 * | 12/2012 | Akagi | F02D 41/18 |
| | | | 702/46 |
| 2002/0011068 A1 * | 1/2002 | Kako | F01N 11/007 |
| | | | 60/285 |
| 2004/0089279 A1 * | 5/2004 | McLaughlin | F02D 41/0027 |
| | | | 123/688 |
| 2011/0072783 A1 * | 3/2011 | Hepburn | F01N 3/023 |
| | | | 60/274 |
| 2012/0197514 A1 * | 8/2012 | Ono | F02D 41/0027 |
| | | | 701/113 |
| 2012/0310510 A1 * | 12/2012 | Imamura | F02D 41/0027 |
| | | | 701/104 |
| 2013/0025577 A1 * | 1/2013 | Huesges | F02M 26/69 |
| | | | 123/568.12 |
| 2014/0083522 A1 * | 3/2014 | Hyde | F02M 21/0209 |
| | | | 137/334 |
| 2015/0300282 A1 * | 10/2015 | Otsubo | F02D 19/02 |
| | | | 123/674 |
| 2016/0222902 A1 * | 8/2016 | Otsubo | F02M 21/047 |
| 2016/0269751 A1 * | 9/2016 | Zhang | H04N 19/597 |
| 2018/0119630 A1 * | 5/2018 | Kishio | F02D 41/1408 |

FOREIGN PATENT DOCUMENTS

| | | |
|---|---|---|
| JP | 2008-038782 A | 2/2008 |
| JP | 2012-154276 A | 8/2012 |

* cited by examiner (a)

(b)

GAS ENGINE

TECHNICAL FIELD

The present invention relates to a gas engine capable of responding to changes in combustion calorific value (hereinafter simply referred to as "calorific value") of fuel gas.

BACKGROUND ART

Generally, air-fuel ratio control in a gas engine is adapted to fuel gas having a predetermined composition. However, the composition of fuel gas actually supplied is not fixed, accordingly, the calorific value of the fuel gas also varies.

Conventionally, a gas engine is proposed, which has a configuration in which the fuel gas is measured using a gas composition measurement device such as a gas chromatography detector so that the air-fuel ratio is controlled according to measured results (for example, see Patent Document 1).

PRIOR ART DOCUMENT

Patent Document

[Patent Document 1] JP 2003-148187 A

SUMMARY OF INVENTION

Problem to be Solved by Invention

However, in the conventional gas engine as described above, the gas composition measurement device such as a gas chromatography detector should be replaced with a new one on a regular basis due to degradation of a column caused by long-term use, which increases equipment costs and labor costs.

Also, in the gas composition measurement device such as a gas chromatography detector, the standard curve varies because of, for example, climatic changes and degradation of the column. Therefore, it is necessary to remake the standard curve regularly using standard gas. Thus, it is difficult to handle the device and substantially, it cannot be used where there is a large difference in temperature.

Furthermore, it takes long time to obtain the measurement results after the composition of the fuel gas is measured, thus the fuel gas actually supplied to the cylinder head may not have the same composition as that measured. In order to address the above problem, it may be possible to make efforts to constitute the passage for supplying the fuel gas so that the fuel gas having the measurement result is supplied to the cylinder head. However, in this case, the device will be complicated.

The present invention was made in consideration of the above circumstances. An object of the present invention is to provide a gas engine capable of controlling air-fuel ratio in response to changes in the calorific value of the fuel gas.

Means for Solving Problem

In order to resolve the above problems, a gas engine according to the present invention includes: a first valve and a second valve provided in parallel on a supply path of fuel gas, the first valve having a responsiveness being lower and a fuel flow rate adjustment range being wider than the second valve, and the second valve having a responsiveness being higher and a fuel flow rate adjustment range being narrower than the first valve; and a control unit to perform perturbation using the second valve by moving the second valve from a predetermined opening degree to a lean side where the opening degree becomes smaller and a rich side where the opening degree becomes larger alternately at a predetermined pitch in a state where the first valve is opened at a predetermined opening degree. When an average value of outputs obtained from an oxygen sensor disposed on an exhaust passage of the gas engine in a period in which an operation condition of the gas engine is deemed to be stable deviates from an output target value of the oxygen sensor set in the control unit for the operation condition, the control unit adjusts an opening degree of the first valve so that the output average value equals the output target value.

In the above-described gas engine, the control unit may calculate the output average value by extracting a maximum output and a minimum output of the oxygen sensor respectively corresponding to a maximum opening degree and a minimum opening degree in the perturbation control by the second valve during the actual operation.

In the above-described gas engine, the control unit may adjust the opening degree of the first valve so that the output average value converges into the output target value with a certain range.

In the above-described gas engine, the first valve and the second valve may be disposed with respect to each cylinder head or with respect to a group of cylinder heads.

In the above-described gas engine, a plurality of the first valves and/or the second valves may be disposed.

In the above-described gas engine, the oxygen sensor may be an upstream oxygen sensor disposed on an upstream side of the exhaust passage relative to a catalyst.

In the above-described gas engine, the oxygen sensor may be a downstream oxygen sensor disposed on a downstream side of the exhaust passage relative to a catalyst.

Effects of Invention

With the present invention, it is possible to control the air-fuel ratio in response to the changes in the composition of the fuel gas.

BRIEF DESCRIPTION OF DRAWINGS

FIG. 13($b$) is a schematic diagram still showing another configuration of the intake section.

MODES FOR CARRYING OUT INVENTION

Hereinafter embodiments of the present invention will be described with reference to the drawings.

Figure 1:
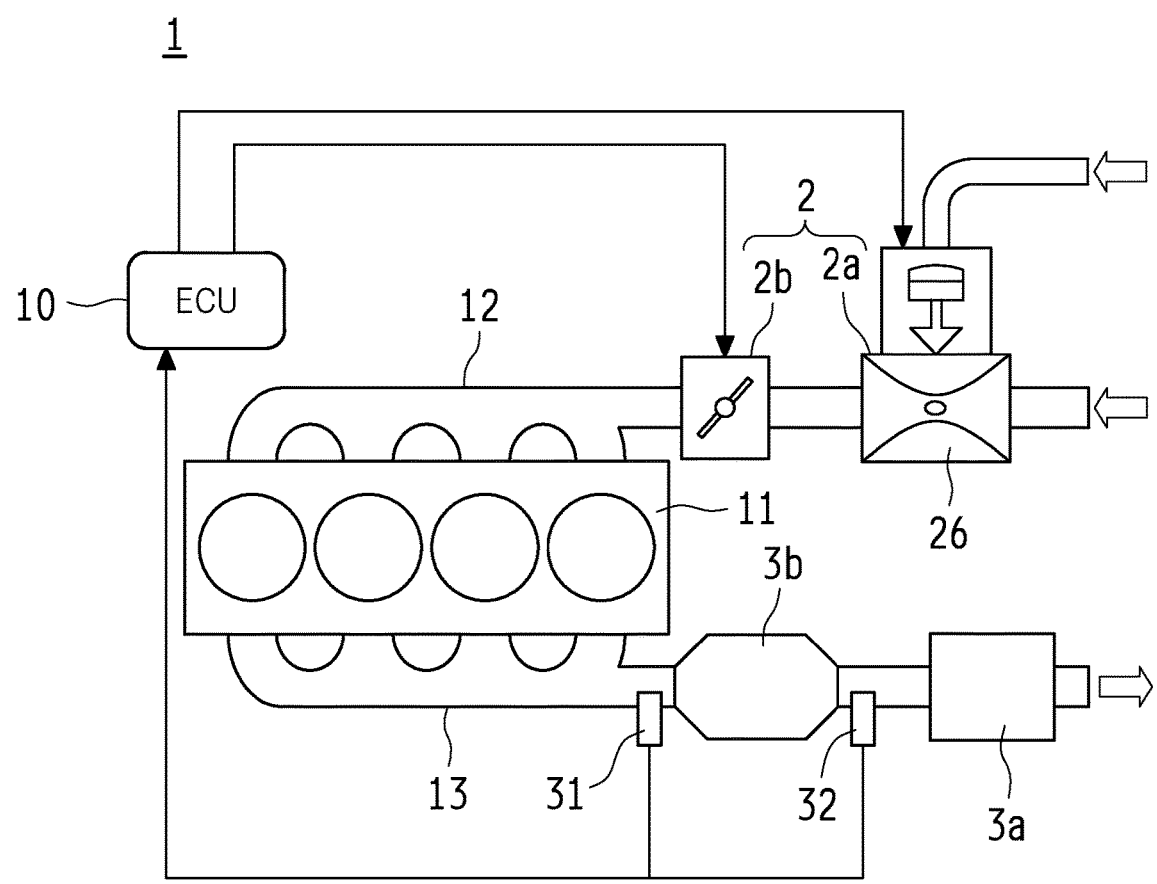
FIG. 1 is a schematic diagram showing an overall configuration of a gas engine according to the present invention.
Figure 2:
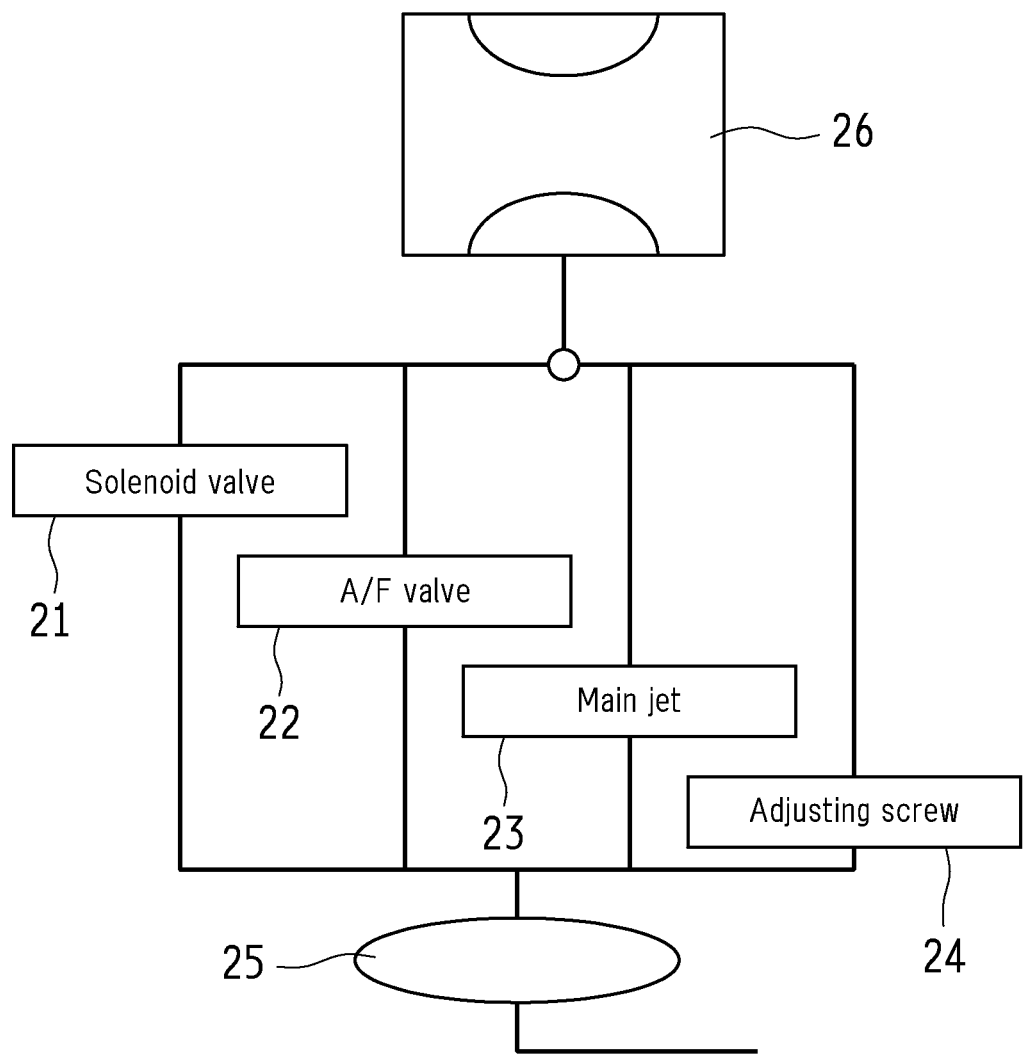
FIG. 2 is a block diagram showing a configuration of a mixing unit for mixing fuel gas and intake air in the gas engine shown in FIG. 1.
Figure 3:
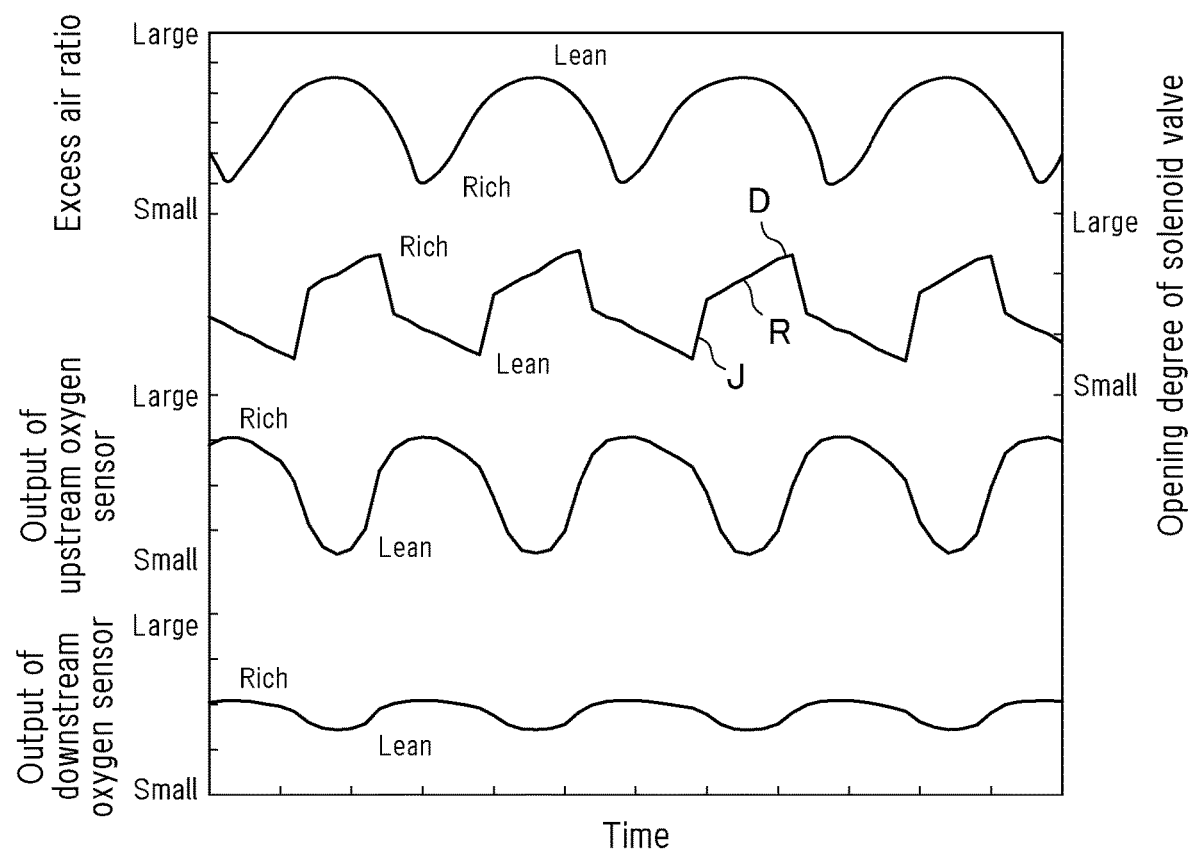
FIG. 3 is a graph showing respective changes with time in an excess air ratio, an opening degree of a solenoid valve, and a sensor output in perturbation control.
Figure 4:
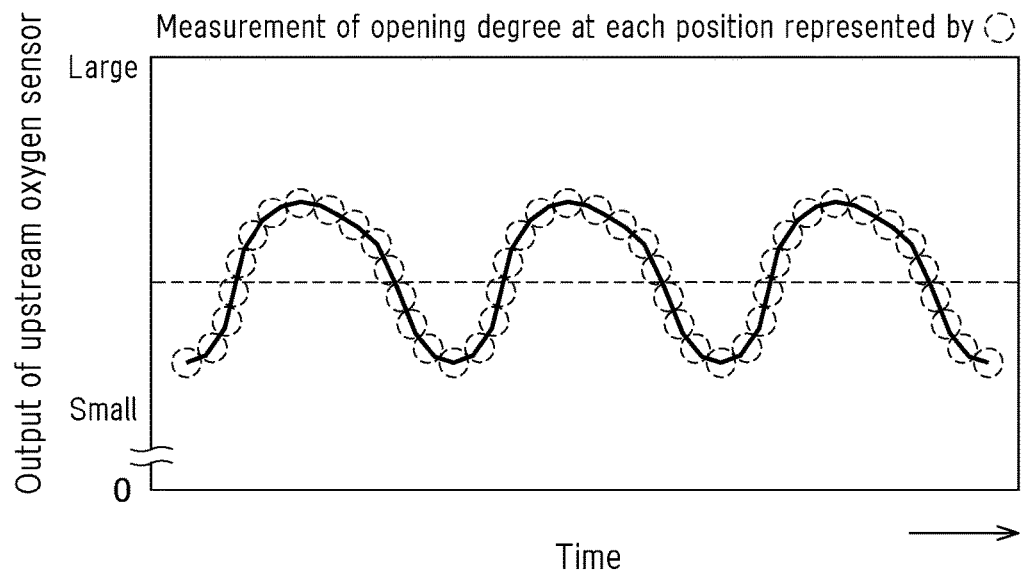
FIG. 4 is a graph indicating a method for calculating an output average value, the graph showing in details changes with time in an output value of an upstream oxygen sensor at the time of the perturbation control.
Figure 5:
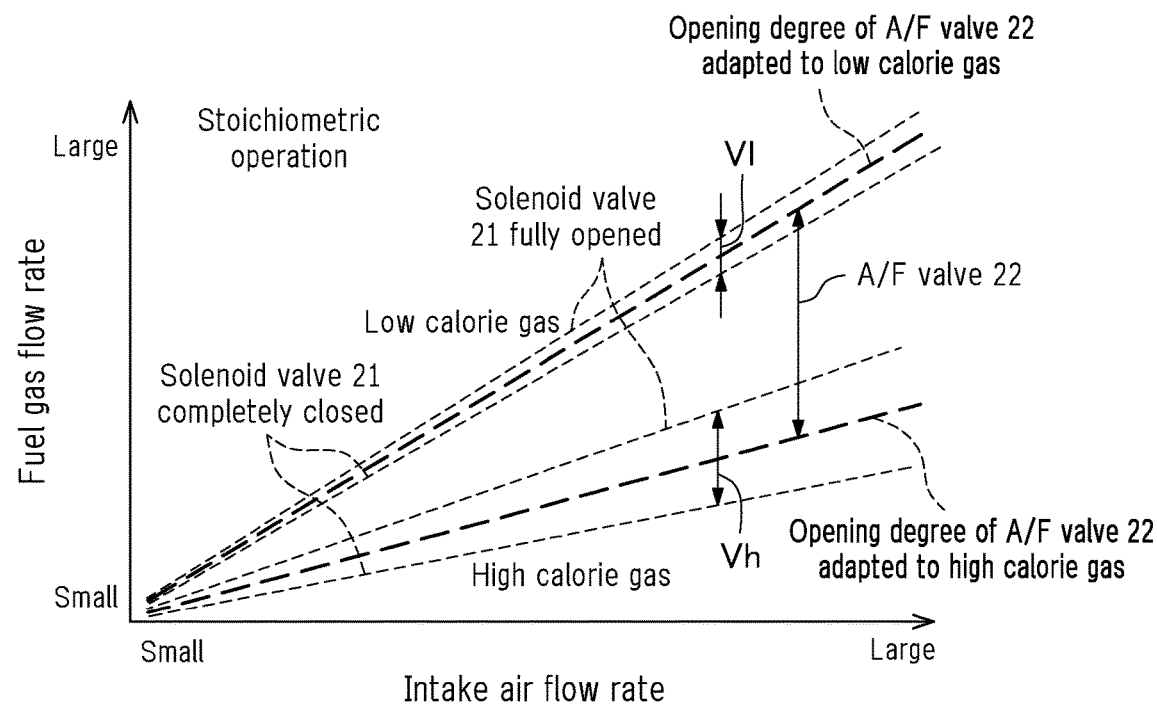
FIG. 5 is a graph showing respective relationships between a flow rate of the fuel gas and a flow rate of intake air in the solenoid valve and in an A/F valve, the respective rates vary depending on changes in a calorific value of the fuel gas.
Figure 6:
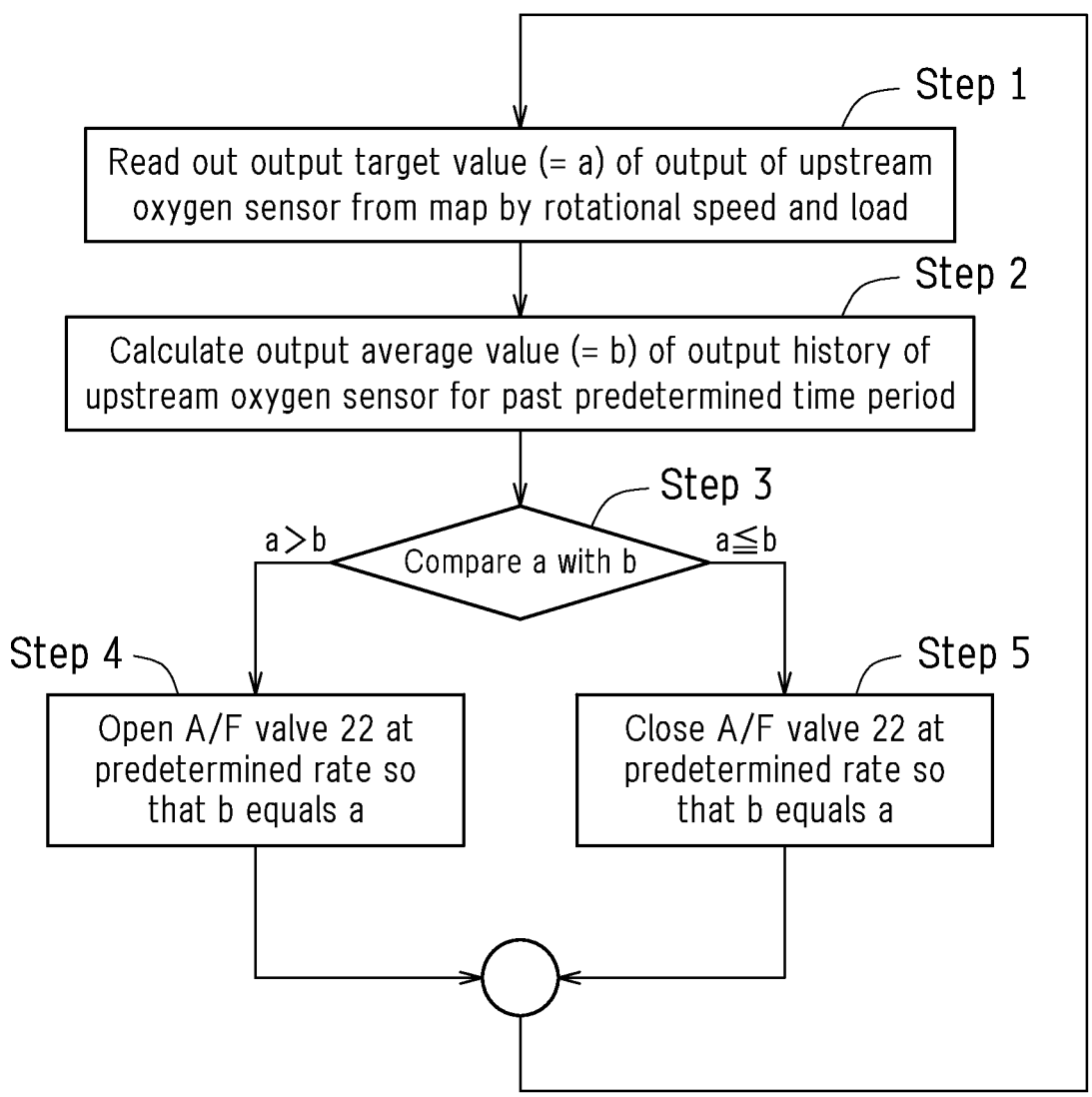
FIG. 6 is a flowchart indicating control by a control unit based on an output from the upstream oxygen sensor in consideration of changes in the calorific value of the fuel gas.

FIG. 1 shows the overall configuration of a gas engine 1 according to the present invention. FIG. 2 shows a mixing unit 2$a$ of the gas engine 1 for mixing fuel gas and intake air. FIG. 3 is a graph showing perturbation control by a control unit 10 of the gas engine 1. FIG. 4 is a graph indicating a method for calculating an output average value b. FIG. 5 is a graph showing respective characteristics of a solenoid valve 21 and an A/F valve 22. FIG. 6 is a flowchart showing control by the control unit 10 in consideration of changes in a calorific value of the fuel gas.

The gas engine 1 includes the solenoid valve 21 and the A/F valve 22 and is configured to perform perturbation by the solenoid valve 21. When the gas engine 1 is operated stoichiometrically at a predetermined engine rotational speed with a predetermined load, an opening degree of the A/F valve 22 is adjusted so that an output average value b, which is obtained from an upstream oxygen sensor 31 disposed on an exhaust passage 13 of the gas engine 1 in a period in which an operation condition of the gas engine is deemed to be stable, equals an output target value a of the upstream oxygen sensor 31 that is set in the control unit 10 for the operation condition.

First, an overall configuration of the gas engine 1 will be described.

The gas engine 1 includes a mixing unit 2$a$ for mixing the air and the fuel gas in an intake passage 12 that is connected to a cylinder head 11. A throttle valve 2$b$ is disposed between the mixing unit 2$a$ and the cylinder head 11. An intake section 2 is made up of the mixing unit 2$a$ and the throttle valve 2$b$. The intake section 2 is controlled by signals from the control unit 10.

As shown in FIG. 2, the mixing unit 2$a$ includes the solenoid valve 21, the A/F valve 22, a main jet 23 and an adjusting screw 24 that are connected in parallel between a regulator 25 and a mixer 26.

The solenoid valve 21 is constituted by a valve having flow rate characteristics that are set to adjust an opening area through which the fuel gas passes, so that the solenoid valve 21 controls the stoichiometric operation in which an excess air ratio ($\lambda$=1) is in a state of the theoretical air-fuel ratio. Regarding the solenoid valve 21, a movable valve is moved by an electromagnetic coil and is opened at a predetermined opening degree. The movable valve is biased so as to close a flow passage using a biasing force of a leaf spring, a spring or the like. The solenoid valve 21 is opened/closed, for example, at a speed of 25 Hz, and a duty ratio during opening/closing is changed. Thus, the opening degree can be adjusted. The solenoid valve 21 is not limited to the one having the speed of 25 Hz. It may be the solenoid valve 21 having each frequency used for this kind of perturbation control. By the above configuration, the solenoid valve 21 has a narrow flow rate adjustment range. However, it can adjust the flow rate quickly. The valve having the flow rate characteristics that constitutes the solenoid valve 21 may be a proportional control valve.

The A/F valve 22 is constituted by a proportional control valve having the flow rate characteristics that are set to adjust an opening area of the passage for the fuel gas, so that the A/F valve 22 controls the range of from the stoichiometric operation in which the excess air ratio ($\lambda$=1) is the theoretical air-fuel ratio, to a lean operation in which the excess air ratio ($\lambda$=1.4 to 1.6) causes lean burn. The A/F valve 22 is configured to adjust the opening degree of the movable valve at every step by rotation of a stepping motor. By the above configuration, the A/F valve 22 cannot adjust the flow rate quickly. However, it has a wide flow rate adjustment range so as to manage the wide range of the excess air ratio.

The main jet 23 is a valve configured to adjust, together with the solenoid valve 21 and the A/F valve 22, the amount of fuel gas that flows from the regulator 25 to the mixer 26. In contrast to the above-described solenoid valve 21 and the A/F valve 22, the opening degree of the main jet 23 is fixed by each number of the main jet 23 to be used.

The adjusting screw 24 is a valve configured to manually adjust the amount of fuel gas, which is generally fixed as well as the main jet 23.

The regulator 25 is configured to control pressure of the fuel gas so that the fuel gas is always supplied under constant pressure.

The mixer 26 is constituted by a venturi tube to mix the air with the fuel gas. The mixer 26 mixes the fuel gas with the air due to the venturi effect of the air drawn according to the opening degree of the throttle valve 2$b$ provided on the downstream side.

A silencer 3$a$ is disposed on the exhaust passage 13 connected to the cylinder head 11. A three way catalyst 3$b$ is disposed between the silencer 3$a$ and the cylinder head 11. On the side of an exhaust gas inlet of the three way catalyst 3b, an upstream oxygen sensor 31 is disposed. Also on the side of an exhaust gas outlet is disposed another oxygen sensor, i.e., a downstream oxygen sensor 32.

At the time of lean operation, the mixing unit 2a operates lean burn at the excess air ratio λ in the range of 1.4 to 1.6. In this case, the control of the excess air ratio λ in the range of 1.4 to 1.6 is performed by controlling the A/F valve 22 using the control unit 10 with the solenoid valve 21 being closed based on a detection result from a wide range oxygen sensor (not shown) disposed on the side of the exhaust gas inlet of the three way catalyst 3b.

At the time of stoichiometric operation, the mixing unit 2a controls perturbation for the stoichiometric operation in which the air-fuel ratio is fluctuated to the lean side or the rich side from the excess air ratio (λ=1) of the theoretical air-fuel ratio as the center. In this case, the perturbation control is performed by controlling fluctuation of the opening degree of the solenoid valve 21 using the control unit 10 based on the detection results from the upstream oxygen sensor 31 and the downstream oxygen sensor 32. Specifically, the solenoid valve 21 is opened to the middle opening degree of the opening/closing region, for example, to the opening degree of 50% while the A/F valve 22 is opened to the middle opening degree of the opening/closing region, for example, to the opening degree of 50%. Then, the solenoid valve 21 is repeatedly opened and closed at a predetermined pitch from the opening degree of 50%.

Here, at the time of stoichiometric operation, the solenoid valve 21 and the A/F valve 22 are set respectively to the middle opening degree of the opening/closing region because proportional control can be accurately performed at the middle opening degree compared with the region of the smaller and larger opening degrees. Therefore, the setting to the middle opening degree is not needed in the case where the proportional control is performed with the same accuracy over the entire opening/closing region due to, for example, correction control in the region of the smaller and larger opening degrees. Note that, in the gas engine 1 performing lean operation, the A/F valve 22 is preferably set to an opening degree larger than the middle opening degree during stoichiometric operation taking into account the fact that the A/F valve 22 is closed at the time of lean operation. Hereinafter, for the sake of convenience, the respective opening degrees of the solenoid valve 21 and the A/F valve 22 are assumed to be 50% in case of stoichiometric operation using the fuel gas having the predetermined calorific value.

The control unit 10 stores input data on relationships between the respective opening degrees of the solenoid valve 21 and the A/F valve 22, and detection results from the upstream oxygen sensor 31, the downstream oxygen sensor 32 and the wide range oxygen sensor (not shown) when the stoichiometric operation or the lean operation is performed using the fuel gas having the predetermined calorific value. The control unit 10 controls the stoichiometric operation or the lean operation in accordance with the input data.

For example, when controlling the stoichiometric operation, the control unit 10 adjusts the opening degree of the A/F valve 22 while maintaining the time-average opening degree of the solenoid valve 21 at 50% so that the detection result of measurement by the upstream oxygen sensor 31 disposed on the inlet side of the three way catalyst 3b is the excess air ratio (λ=1) of the theoretical air-fuel ratio. In this case, when the standard fuel gas is supplied, the opening degree of the A/F valve 22 is also maintained at 50%.

The perturbation control for the stoichiometric operation in which the air-fuel ratio is fluctuated to the lean side or the rich side from the excess air ratio (λ=1) of the theoretical air-fuel ratio as the center is performed by controlling the opening degree of the solenoid valve 21 based on the detection results of measurements by the upstream oxygen sensor 31 disposed on the inlet side of the three way catalyst 3b and the downstream oxygen sensor 32 disposed on the downstream side, i.e., on the outlet side of the three way catalyst 3b. The perturbation performed by the control unit 10 is described hereinafter.

As shown in FIG. 3, an oxygen concentration of the exhaust gas before flowing into the three way catalyst 3b is measured by the upstream oxygen sensor 31. When the upstream oxygen sensor 31 determines that the air-fuel ratio is richer than the stoichiometric operation, the solenoid valve 21 is moved toward the closing direction where the air-fuel ratio is leaner than the value set for the stoichiometric operation.

Then, oxygen excessively presents in the exhaust gas is absorbed by the three way catalyst 3b, and the oxygen stored in the three way catalyst 3 is saturated. Thus, the downstream oxygen sensor 32 disposed on the downstream side of the three way catalyst 3b indicates the shift to the lean side after a predetermined response time from the switching of the solenoid valve 21.

Also, the upstream oxygen sensor 31 disposed on the upstream side of the three way catalyst 3b indicates determination that the air-fuel ratio is leaner than the stoichiometric air-fuel ratio due to closing movement of the solenoid valve 21 to the leaner side. According to the above determination, the solenoid valve 21 is moved toward the opening direction where the air-fuel ratio is richer than the value set for the stoichiometric operation.

Then, oxygen stored in the three way catalyst 3b is released into the exhaust gas to purify the exhaust gas. After a little while, the oxygen stored in the three way catalyst 3b is depleted, then the downstream oxygen sensor 32 disposed on the downstream side of the three way catalyst 3b indicates the shift to the rich side after a predetermined response time from the switching of the solenoid valve 21.

After that, the air-fuel ratio is changed at a predetermined pitch of about 1 to 2 seconds (perturbation is performed). Thus, the downstream oxygen sensor 32 disposed on the downstream side of the three way catalyst 3b determines that the air-fuel ratio is changed smoothly between the lean side and the rich side relative to the excess air ratio (λ=1) of the theoretical air-fuel ratio. In this case, the three way catalyst 3b absorbs and releases repeatedly the oxygen, thus the active state of the catalyst is maintained.

The control unit 10 stores a control map as shown in FIG. 3. When the stoichiometric operation is performed using the fuel gas having the predetermined calorific value, the control is performed in accordance with the control map.

The opening degree of the solenoid valve 21 is determined by the following control parameters: a jump quantity J for rapidly opening the valve for a predetermined time period; a ramp-up speed R for smoothly opening the valve for a predetermined time period after the rapid opening; and a delay time D that lasts till the solenoid valve 21 is rapidly closed. Therefore, as to the opening degree of the solenoid valve 21 that is input into the control unit 10, the above conditions to change the opening degree at the time of the perturbation control are also input. The control unit 10 recognizes an output value of the oxygen concentration in the excess air ratio (λ=1) of the theoretical air-fuel ratio during stoichiometric operation, which is output from the upstream oxygen sensor 31, as the output target value a. The output target value a is calculated based on the average value per unit time of the output values of the upstream oxygen sensor 31.

The control unit 10 also calculates the output average value b under the actual operation condition based on a history of the output values of the oxygen concentration from the upstream oxygen sensor 31 for a predetermined time period in which the actual operation condition is deemed to be stable under the perturbation control by the solenoid valve 21 at a predetermined engine rotational speed and with a predetermined load. As shown in FIG. 4, the output average value b is calculated by measuring, at each stage, the output value of the oxygen concentration that varies by the perturbation control. In FIG. 4, the output values for three cycles are averaged. However, the output average value b is not limited to be the average value for three cycles. The output average value b may be the average of the output values for one cycle or two cycles. Also, the output values for three cycles or more may be averaged. If the output average value b is calculated by tracing the history of the output values back for just one cycle from the actual operation condition, such a value is approximate to the one under the actual operation condition, and data can be processed quickly. However, in this case, data stability is a concern. If the output average value b is calculated by tracing the history of the output values back for three cycles or more from the actual operation condition, stable data can be obtained due to a large amount of data for calculating the average, however, data is slowly processed because data to be processed is heavy. Therefore, as to how much data in the history of the output values is traced back from the actual operation condition to calculate the output average value b, it is suitably determined according to the gas engine 1 to be used and its operating environment.

The control unit 10 compares the output average value b calculated as described above under the actual operation condition and the output target value a, which is essential and input into the control unit 10 under the same condition as the value b. When the output average value b is smaller than the output target value a, the control unit 10 increases the opening degree of the A/F valve 22 at the rate according to the smallness. When the output average value b is equal to or larger than the output target value a, the control unit 10 maintains or further decreases the opening degree of the A/F valve 22 at the rate according to the largeness. Thus, the control unit 10 performs the control so that the output average value b coincides with the output target value a.

Next, description will be given on control by the control unit 10 taking into account changes in calorific value of the fuel gas.

As described above, when the standard fuel gas having the predetermined calorific value is supplied, the control is performed by the control unit 10. However, when the actually supplied fuel gas has the calorific value smaller than or larger than that of the standard fuel gas, it is necessary to set once again the opening degree of the A/F valve 22 to a value according to the calorific value of the actually supplied fuel gas by opening/closing the A/F valve 22 having the wide flow rate adjustment range as shown in FIG. 5. For example, in a state in which the A/F valve 22 has an opening degree adapted to a low calorie fuel gas or a high calorie fuel gas, even when the solenoid valve 21 is fully opened or completely closed, the flow rate adjustment ranges V1 and Vh by the solenoid valve 21 are limited. Thus, it is not possible to control the range of the fuel gas having the low calorific value to the high calorific value with only the solenoid valve 21.

Furthermore, assume that the calorific value of the fuel gas has changed during the control by the control unit 10 such as the perturbation control as described above, in which the solenoid valve 21 is opened/closed while the opening degree of the A/F valve 22 is maintained. Such a change slips into the perturbation control by the solenoid valve 21, accordingly it cannot be determined whether the above change is a result of the perturbation control or of the change in the calorific value of the fuel gas. That is, under the actual operation condition, when the calorific value of the fuel gas changes, the solenoid valve 21 capable of adjusting quickly the flow rate follows and controls the change. As a result, when the air-fuel ratio is changed due to the change in the calorific value of the fuel gas, the perturbation control is performed with the solenoid valve 21 being deviated in the opening direction or in the closing direction. As the range controlled by the solenoid valve 21 is narrow, the solenoid valve 21 may be easily deviated from the range to control, thereby impossible to be operated.

In order to address the above problem, when the calorific change in the fuel gas begins to cause the deviation of the opening degree of the solenoid valve 21 in the opening direction or the closing direction, the control unit 10 is controlled as described below so as to adjust the opening degree not by the solenoid valve 21 but by the A/F valve 22.

The gas engine 1 starts to perform stoichiometric operation at the excess air ratio ($\lambda=1$) of the theoretical air-fuel ratio. In the stoichiometric operation, the opening degree of the A/F valve 22 is adjusted while maintaining the time-average opening degree of the solenoid valve 21 at 50%. In this case, if the fuel gas has the predetermined calorific value and the stoichiometric operation is performed at the predetermined engine rotational speed and with the predetermined load, then the opening degree of the A/F valve 22 is expected to coincide with the opening degree previously set in the control unit 10, i.e., the opening degree of 50%. However, there is no guarantee that the fuel gas supplied to the gas engine 1 at the time of the actual operation will be the same one. The calorific value of the fuel gas fluctuates, sometimes increases and sometimes decreases in a day, depending on counties and regions.

As shown in FIG. 6, in order to assess the calorific changes in the fuel gas, the predetermined engine rotational speed and the predetermined load at the time of the stoichiometric operation are detected so as to read out the output target value a of the upstream oxygen sensor 31 that is set in the control unit 10 under the above condition (Step 1).

The output history of the upstream oxygen sensor 31 under the actual operation condition is traced back to the past from the time when the output target value a is read out so as to calculate the average value of the output history of the upstream oxygen sensor 31 for the predetermined time period to obtain the output average value b (Step 2).

If the calorific value of the fuel gas does not change, the output target value a read out in Step 1 should coincide with the output average value b calculated in Step 2. Thus, the output target value a is compared with the output average value b (Step 3).

When the output average value b is smaller than the output target value a, such a fact indicates that the calorific value of the fuel gas is small by the above difference and the excess air ratio detected by the upstream oxygen sensor 31 begins to deviate to the lean side. Thus, the A/F valve 22 is opened at the predetermined rate (Step 4).

When the output average value b is larger than the output target value a, such a fact indicates that the calorific value of the fuel gas is large by the above difference and the excess air ratio detected by the upstream oxygen sensor 31 begins to deviate to the rich side. Thus, the A/F valve 22 is closed at the predetermined rate. Also, when the output average value b is equal to the output target value a, such a fact indicates that the calorific value of the fuel gas does not change and the excess air ratio detected by the upstream oxygen sensor 31 does not deviate. Thus, the opening degree of the A/F valve 22 is maintained at the current rate (Step 5).

After that, the control process from Step 1 is repeated.

In this embodiment, the control unit 10 adjusts the opening degree of the A/F valve 22 by comparing the output target value a with the output average value b both obtained by the upstream oxygen sensor 31. However, the control unit 10 may adjust the opening degree of the A/F valve 22 by comparing the output target value a with the output average value b both obtained by the downstream oxygen sensor 32 disposed on the side of the exhaust gas outlet of the three way catalyst 3b.

Figure 7:
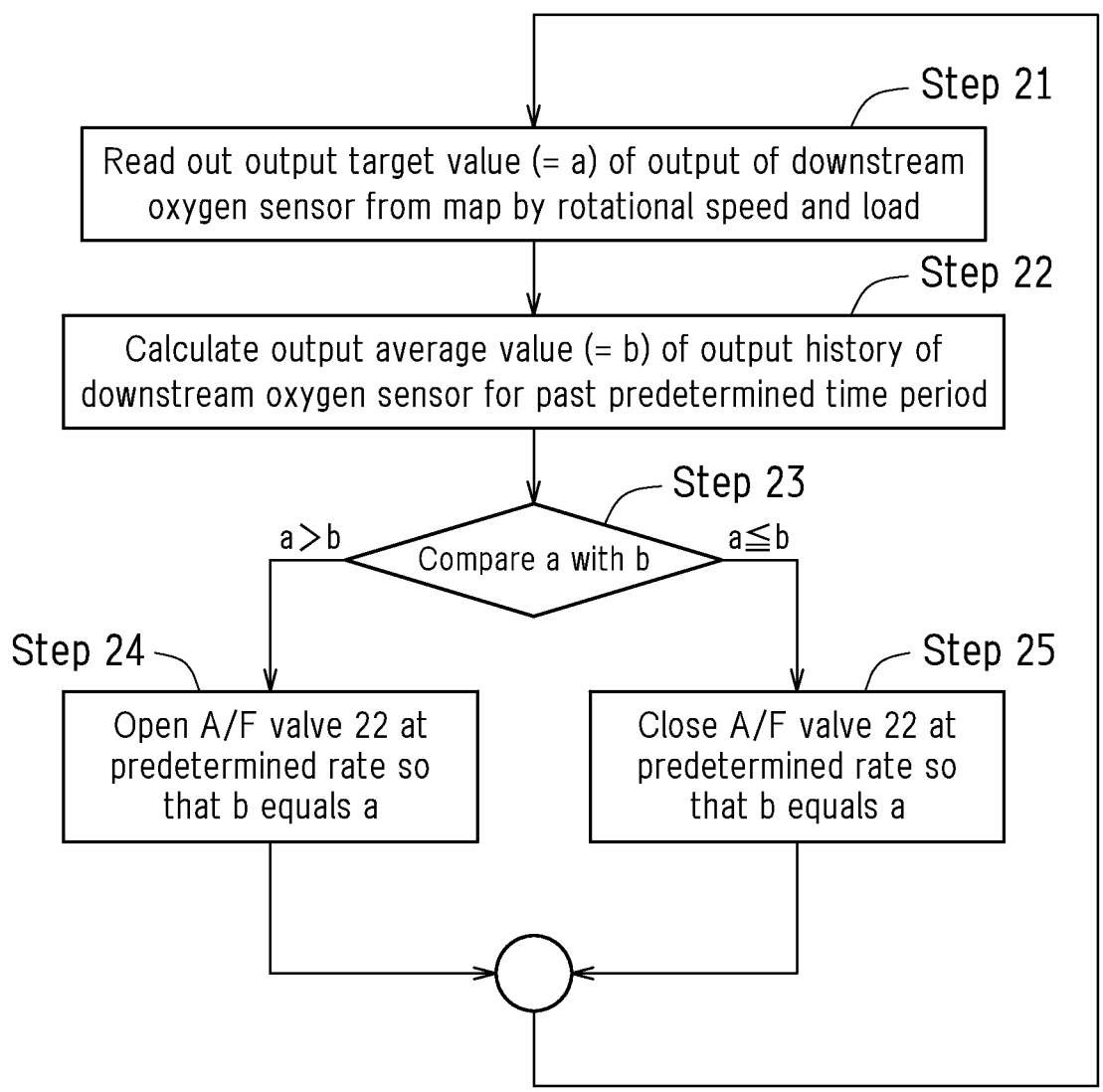
FIG. 7 is a flowchart indicating control by the control unit based on an output from a downstream oxygen sensor in consideration of changes in the calorific value of the fuel gas.

FIG. 7 is a flowchart indicating control by the control unit 10 to adjust the opening degree of the A/F valve 22 by comparing the output target value a with the output average value b both obtained by the downstream oxygen sensor 32. In order to assess the calorific changes in the fuel gas, the predetermined engine rotational speed and the predetermined load at the time of the stoichiometric operation are detected so as to read out the output target value a of the downstream oxygen sensor 32 that is set in the control unit 10 under the above condition (Step 21).

The output history of the downstream oxygen sensor 32 under the actual operation condition is traced back to the past from the time when the output target value a is read out so as to calculate the average value of the output history of the downstream oxygen sensor 32 for the predetermined time period to obtain the output average value b (Step 22).

If the calorific value of the fuel gas does not change, the output target value a read out in Step 21 should coincide with the output average value b calculated in Step 22. Thus, the output target value a is compared with the output average value b (Step 23).

When the output average value b is smaller than the output target value a, such a fact indicates that the calorific value of the fuel gas is small by the above difference and the excess air ratio detected by the downstream oxygen sensor 32 begins to deviate to the lean side. Thus, the A/F valve 22 is opened at the predetermined rate (Step 24).

When the output average value b is larger than the output target value a, such a fact indicates that the calorific value of the fuel gas is large by the above difference and the excess air ratio detected by the downstream oxygen sensor 32 begins to deviate to the rich side. Thus, the A/F valve 22 is closed at the predetermined rate. Also, when the output average value b is equal to the output target value a, such a fact indicates that the calorific value of the fuel gas does not change and the excess air ratio detected by the downstream oxygen sensor 32 does not deviate. Thus, the opening degree of the A/F valve 22 is maintained at the current rate (Step 25).

After that, the control process from Step 21 is repeated.

By the control shown in FIGS. 6 and 7, when the fuel gas having the calorific value smaller or larger than that of the standard fuel gas is supplied, the gas engine 1 can handle the situation by adjusting the opening degree of the A/F valve 22, not the solenoid valve 21 coordinating with the output value of the upstream oxygen sensor 31 or the downstream oxygen sensor 32 in the perturbation control. Thus, in the case where the calorific value of the fuel gas remarkably changes, the gas engine 1 can address the change so as to continuously perform the perturbation control using the solenoid valve 21 in the stoichiometric operation. Thus, it is possible to maintain exhaust gas purification performance for a long time, which results in extending the maintenance interval. Also, a catalyst is not required to contain an increased amount of precious metals or to have an increased storage capacity. Thus, it is possible to suppress cost increase for the catalyst. Furthermore, the gas engine 1 can be operated even when using a fuel gas having a large variation in calorific value. In addition, it is possible to use the gas engine 1 in multiple counties or regions where the respective fuel gases have different calorific values.

As shown in FIG. 5, the gas flow rate adjustment range V1 remarkably differs from the gas flow rate adjustment range Vh. The gas flow rate adjustment range V1 is a range when the solenoid valve 21 is fully opened from the completely closed state under the situation where the low calorie fuel gas is supplied. The gas flow rate adjustment range Vh is a range when the solenoid valve 21 is fully opened from the completely closed state under the situation where the high calorie fuel gas is supplied. Thus, if the perturbation control is performed with the solenoid valve 21 having the same amount of change in the opening degree, the fluctuation range of the air-fuel ratio increases under the situation where the high calorie fuel gas is supplied while it decreases under the situation where the low calorie fuel gas is supplied. Accordingly, the perturbation control does not work well. Therefore, when the perturbation control in the stoichiometric operation is performed using the solenoid valve 21, it is preferable that the amount of change in the opening degree of the solenoid valve 21 is increased in consideration of the flow rate adjustment range V1 when the opening degree of the A/F valve 22 is re-adapted to the low calorie fuel gas, and that the amount of change in the opening degree of the solenoid valve 21 is decreased in consideration of the flow rate adjustment range Vh when the opening degree of the A/F valve 22 is re-adapted to the high calorie fuel gas. Thus, it is possible to perform the perturbation control with the stable fluctuation range of the air-fuel ratio. In this case, the amount of change in the opening degree of the solenoid valve 21 in consideration of the respective flow rate adjustment ranges V1 and Vh can be set and input into the control unit 10 so as to coordinate with the opening degree of the A/F valve 22.

Figure 8:
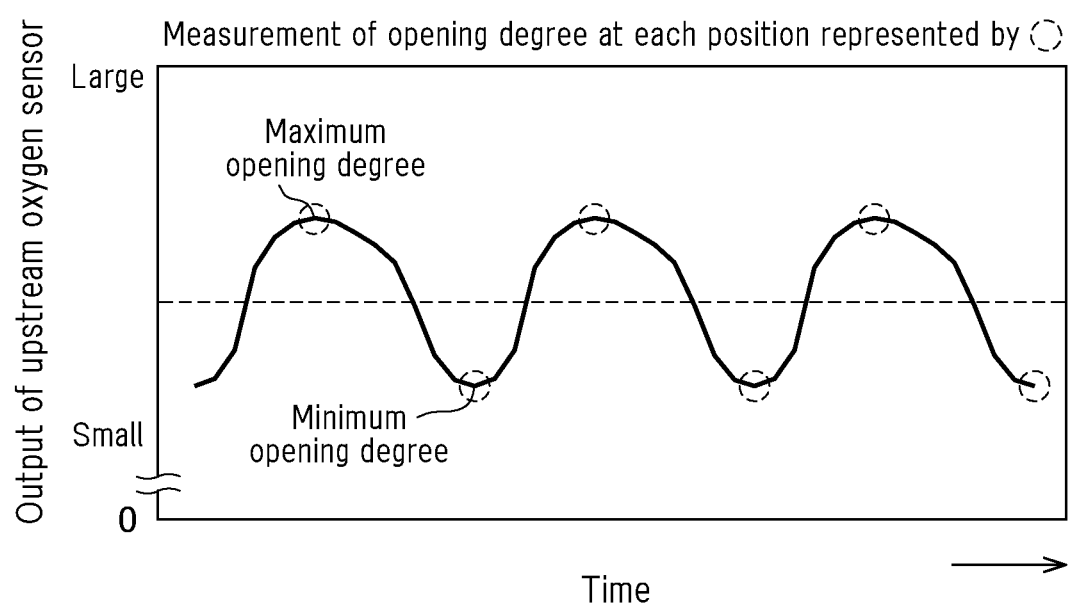
FIG. 8 is a graph indicating another method for calculating the output average value, the graph showing in details changes with time in the output value of the upstream oxygen sensor at the time of the perturbation control.
Figure 9:
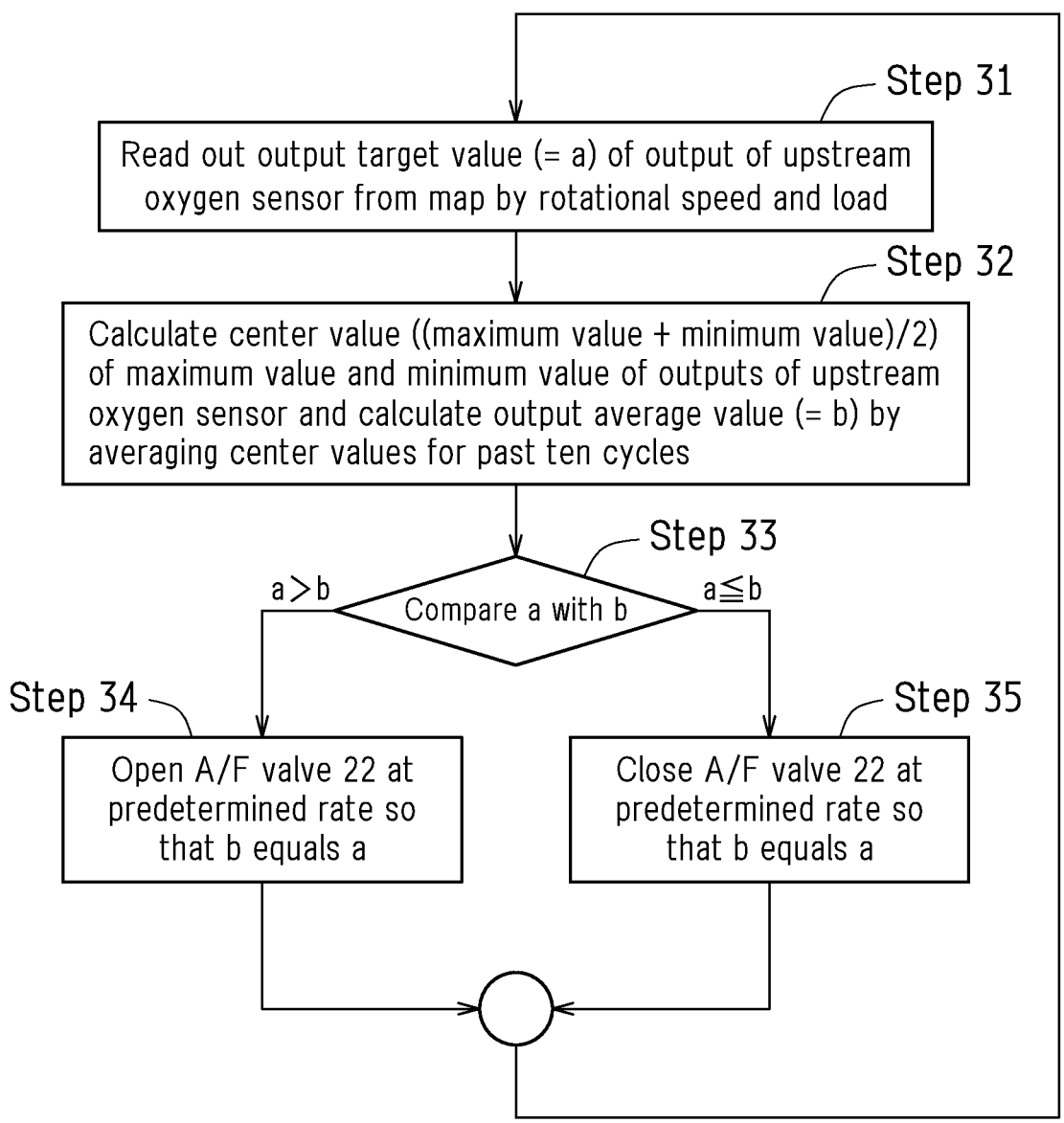
FIG. 9 is a flowchart indicating control by the control unit based on an output from the upstream oxygen sensor in consideration of changes in the calorific value of the fuel gas for the gas engine according to another embodiment of the present invention.

In this embodiment, the output average value b is calculated by measuring the output value of the upstream oxygen sensor 31 at each stage of the corresponding excess air ratio in the perturbation control, as shown in FIG. 4. However, in the above case, a large amount of data is required to calculate the output average value b, which places a burden on the control unit 10. Therefore, the output average value b may be calculated simply by measuring and averaging maximum output values and minimum output values of the upstream oxygen sensor 31 in the perturbation control as shown in FIG. 8. In this case, the maximum output values and the minimum output values of the upstream oxygen sensor 31 are detected as the respective positions of inflection points of the variation curve of the output values obtained from the upstream oxygen sensor 31. The number of piece of data that is required to calculate the output average value b is two per one cycle of the perturbation control. Thus, even when the output average value b is measured, for example, by tracing back the data for the past ten cycles, the control unit 10 can process the data without bearing the burden. FIG. 9 discloses the control performed by the control unit 10 using the output average value b calculated by the above-described means.

That is, in order to assess the calorific changes in the fuel gas, the predetermined engine rotational speed and the predetermined load at the time of the stoichiometric operation are detected so as to read out the output target value a of the upstream oxygen sensor 31 that is set in the control unit 10 under the above condition (Step 31).

The output history of the upstream oxygen sensor 31 under the actual operation condition is traced back to the past from the time when the output target value a is read out so as to calculate the average value of the output history of the upstream oxygen sensor 31 for the predetermined time period to obtain the output average value b. At this time, the respective maximum output values and the respective minimum output values of the upstream oxygen sensor 31 are measured by tracing back the data for the past ten cycles so as to be averaged to obtain the output average value b (Step 32).

If the calorific value of the fuel gas does not change, the output target value a read out in Step 31 should coincide with the output average value b calculated in Step 32. Thus, the output target value a is compared with the output average value b (Step 33).

When the output average value b is smaller than the output target value a, such a fact indicates that the calorific value of the fuel gas is small by the above difference and the excess air ratio detected by the upstream oxygen sensor 31 begins to deviate to the lean side. Thus, the A/F valve 22 is opened at the predetermined rate (Step 34).

When the output average value b is larger than the output target value a, such a fact indicates that the calorific value of the fuel gas is large by the above difference and the excess air ratio detected by the upstream oxygen sensor 31 begins to deviate to the rich side. Thus, the A/F valve 22 is closed at the predetermined rate. Also, when the output average value b is equal to the output target value a, such a fact indicates that the calorific value of the fuel gas does not change and the excess air ratio detected by the upstream oxygen sensor 31 does not deviate. Thus, the opening degree of the A/F valve 22 is maintained at the current rate (Step 35).

After that, the control process from Step 31 is repeated.

In this embodiment, the control unit 10 adjusts the opening degree of the A/F valve 22 by comparing the output target value a with the output average value b both obtained by the upstream oxygen sensor 31. However, the control unit 10 may adjust the opening degree of the A/F valve 22 by comparing the output target value a with the output average value b both obtained by the downstream oxygen sensor 32 disposed on the side of the exhaust gas outlet of the three way catalyst 3b.

Figure 10:
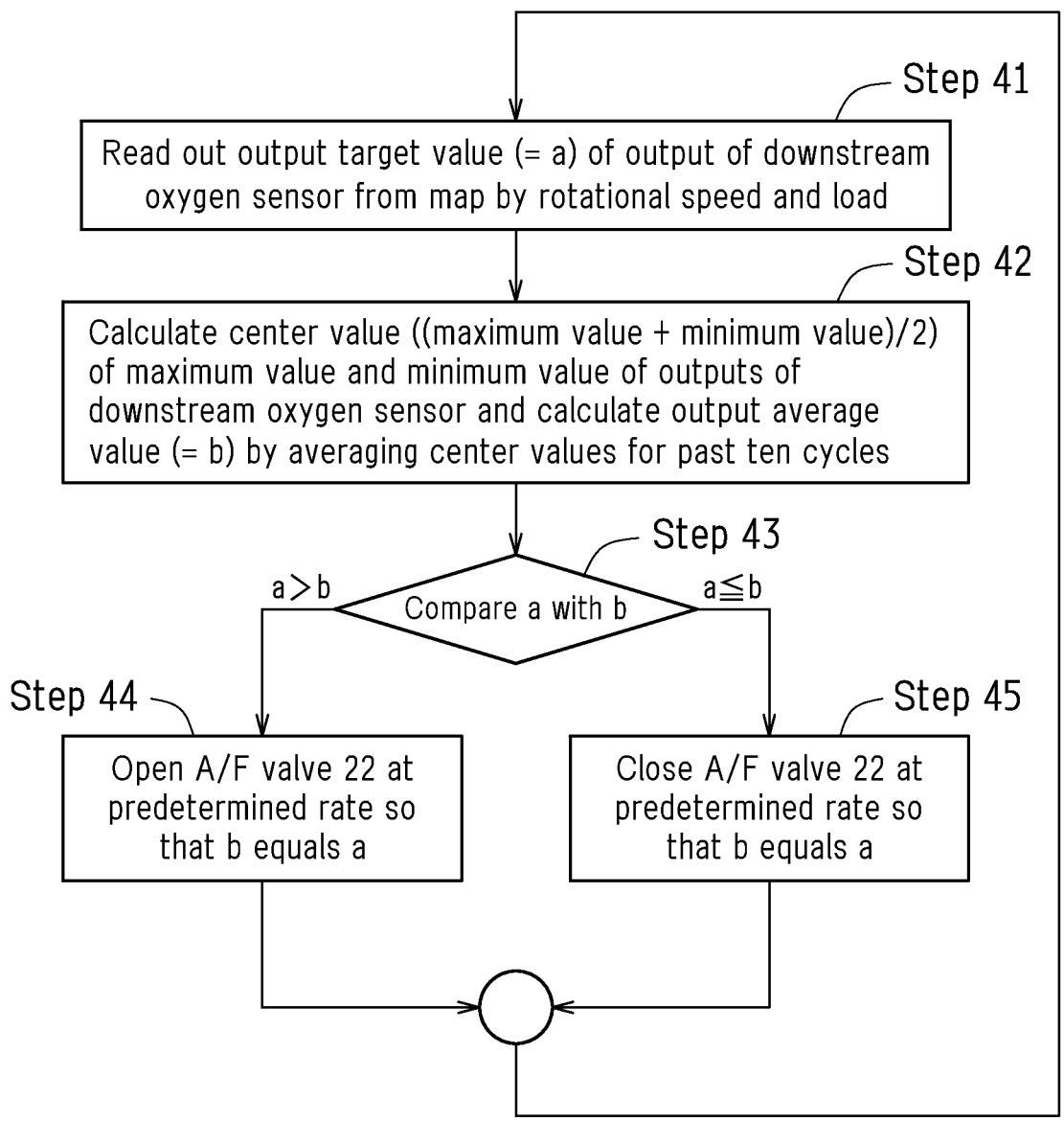
FIG. 10 is a flowchart indicating control by the control unit based on an output from the downstream oxygen sensor in consideration of changes in the calorific value of the fuel gas for the gas engine according to another embodiment of the present invention.

FIG. 10 is a flowchart indicating control by the control unit 10 to adjust the opening degree of the A/F valve 22 by comparing the output target value a with the output average value b both obtained by the downstream oxygen sensor 32. In order to assess the calorific changes in the fuel gas, the predetermined engine rotational speed and the predetermined load at the time of the stoichiometric operation are detected so as to read out the output target value a of the downstream oxygen sensor 32 that is set in the control unit 10 under the above condition (Step 41).

The output history of the downstream oxygen sensor 32 under the actual operation condition is traced back to the past from the time when the output target value a is read out so as to calculate the average value of the output history of the downstream oxygen sensor 32 for the predetermined time period to obtain the output average value b. At this time, the respective maximum output values and the respective minimum output values of the downstream oxygen sensor 32 are measured by tracing back the data for the past ten cycles so as to be averaged to obtain the output average value b (Step 42).

If the calorific value of the fuel gas does not change, the output target value a read out in Step 41 should coincide with the output average value b calculated in Step 42. Thus, the output target value a is compared with the output average value b (Step 43).

When the output average value b is smaller than the output target value a, such a fact indicates that the calorific value of the fuel gas is small by the above difference and the excess air ratio detected by the downstream oxygen sensor 32 begins to deviate to the lean side. Thus, the A/F valve 22 is opened at the predetermined rate (Step 44).

When the output average value b is larger than the output target value a, such a fact indicates that the calorific value of the fuel gas is large by the above difference and the excess air ratio detected by the downstream oxygen sensor 32 begins to deviate to the rich side. Thus, the A/F valve 22 is closed at the predetermined rate. Also, when the output average value b is equal to the output target value a, such a fact indicates that the calorific value of the fuel gas does not change and the excess air ratio detected by the downstream oxygen sensor 32 does not deviate. Thus, the opening degree of the A/F valve 22 is maintained at the current rate (Step 45).

After that, the control process from Step 41 is repeated.

By the control shown in FIGS. 9 and 10, when the fuel gas having the calorific value smaller or larger than that of the standard fuel gas is supplied, the gas engine 1 can handle the situation by adjusting the opening degree of the A/F valve 22, not the solenoid valve 21. Thus, in the case where the calorific value of the fuel gas remarkably changes, the gas engine 1 can address the change so as to continuously perform the perturbation control using the solenoid valve 21 in the stoichiometric operation.

Also, the control unit 10 can process the data without bearing the burden to calculate the output average value b, so that the air-fuel ratio can be controlled.

In the control shown in FIGS. 9 and 10, the output average value b is averaged and calculated by measuring the respective maximum output values and the respective minimum output values by tracing back the data for the past ten cycles (Steps 32 and 42). However, the basis of calculation of the output average value b is not particularly limited to the output history for ten cycles, which may be suitably changed according to the engine 1 to be used or its installation environment.

Also, in the above-described embodiments, the output target value a is compared with the output average value b so that the A/F valve 22 is controlled at the predetermined rate by the difference resulted from the above comparison. However, it is difficult that the output target value a coincides perfectly with the output average value b. Thus, in the above control, the A/F valve 22 is repeatedly opened and closed at short intervals, which may result in a heavy burden on the control unit 10. In order to address the above, the control unit 10 may store, together with each output target value a mapped in the control unit 10, a corresponding dead range c so as to perform the control using the dead range c, as shown in FIG. 11.

The dead range c is set so that the A/F valve 22 is not too frequently opened and closed in response to the difference between the output target value a and the output average value b. The dead range c is a range of values and the opening degree of the A/F valve 22 is not changed unless the difference between the output target value a and the output average value b is beyond this range. Therefore, the dead range c is suitably set according to the gas engine 1 to be used and its operating environment.

Figure 11:
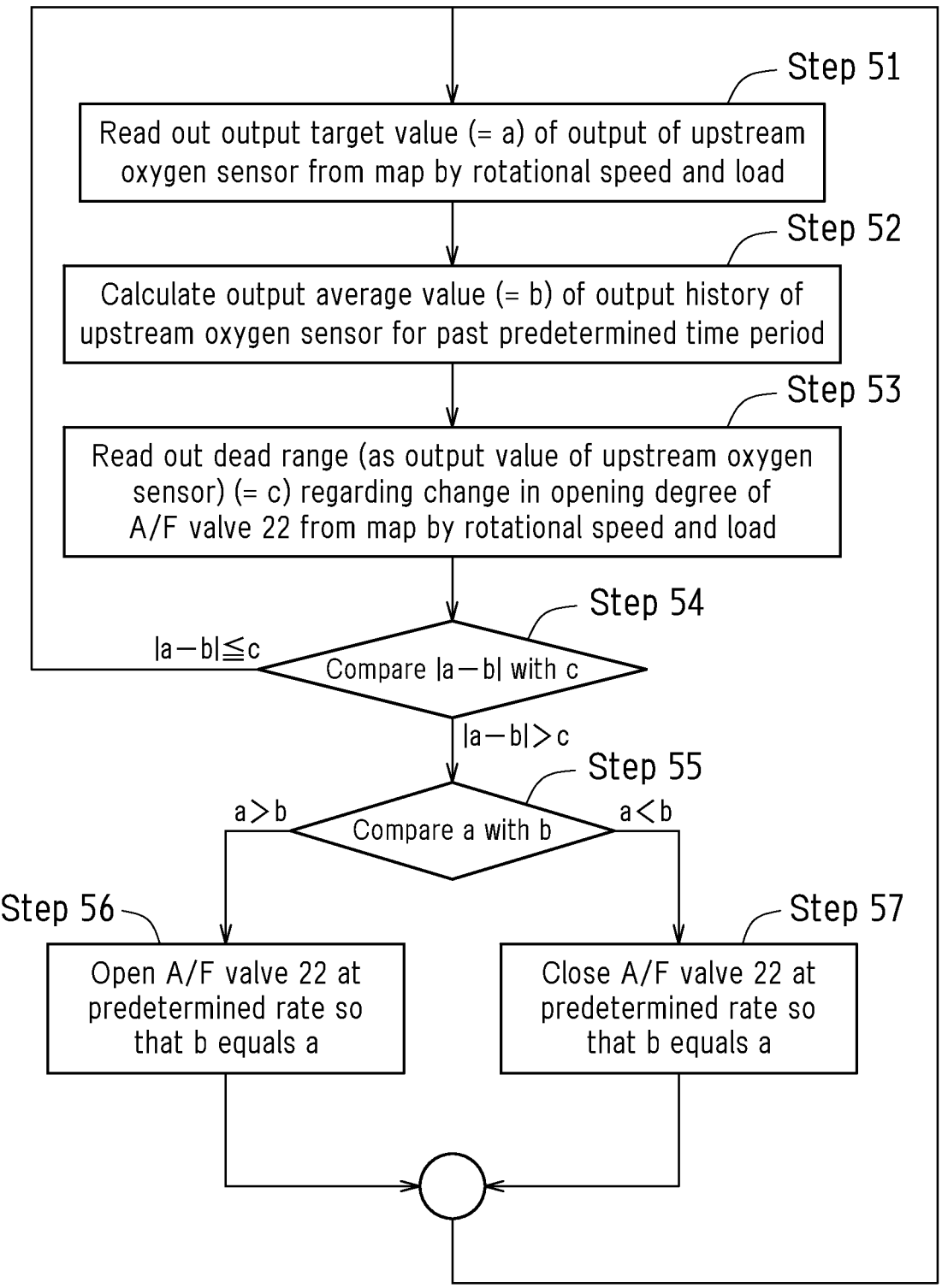
FIG. 11 is a flowchart indicating control by the control unit based on an output from the upstream oxygen sensor in consideration of changes in the calorific value of the fuel gas for the gas engine according to another embodiment of the present invention.

FIG. 11 is a flowchart indicating control by the control unit 10 to adjust the opening degree of the A/F valve 22 by comparing the output target value a with the output average value b both obtained by the upstream oxygen sensor 31. In order to assess the calorific changes in the fuel gas, the predetermined engine rotational speed and the predetermined load at the time of the stoichiometric operation are detected so as to read out the output target value a of the upstream oxygen sensor 31 that is set in the control unit 10 under the above condition (Step 51).

The output history of the upstream oxygen sensor 31 under the actual operation condition is traced back to the past from the time when the output target value a is read out so as to calculate the average value of the output history of the upstream oxygen sensor 31 for the predetermined time period to obtain the output average value b (Step 52).

The dead range c is read out from the control unit 10. The dead range c is in the period for which the engine rotational speed and the load are constant and from which the output target value a is also read out (Step 53).

If the calorific change in the fuel gas is small, the difference between the output target value a read out in Step 51 and the output average value b calculated in Step 52 should be smaller than the dead range c. Thus, the difference between the output target value a and the output average value b(|a−b|) is compared with the dead range c (Step 54).

If the difference between the output target value a and the output average value b(|a−b|) is equal to or smaller than the dead range c, the calorific change in the fuel gas is within the acceptable range. Thus, the control process from Step 51 is repeated.

If the difference between the output target value a and the output average value b(|a−b|) is larger than the dead range c, the calorific change in the fuel gas is beyond the acceptable range. Thus, the output target value a is compared with the output average value b (Step 55).

When the output average value b is smaller than the output target value a, such a fact indicates that the calorific value of the fuel gas is small by the above difference and the excess air ratio detected by the upstream oxygen sensor 31 begins to deviate to the lean side. Thus, the A/F valve 22 is opened at the predetermined rate (Step 56).

When the output average value b is larger than the output target value a, such a fact indicates that the calorific value of the fuel gas is large by the above difference and the excess air ratio detected by the upstream oxygen sensor 31 begins to deviate to the rich side. Thus, the A/F valve 22 is closed at the predetermined rate (Step 57).

After that, the control process from Step 51 is repeated.

In this embodiment, the control unit 10 adjusts the opening degree of the A/F valve 22 by comparing the output target value a with the output average value b both obtained by the upstream oxygen sensor 31. However, the control unit 10 may adjust the opening degree of the A/F valve 22 by comparing the output target value a with the output average value b both obtained by the downstream oxygen sensor 32 disposed on the side of the exhaust gas outlet of the three way catalyst 3b.

Figure 12:
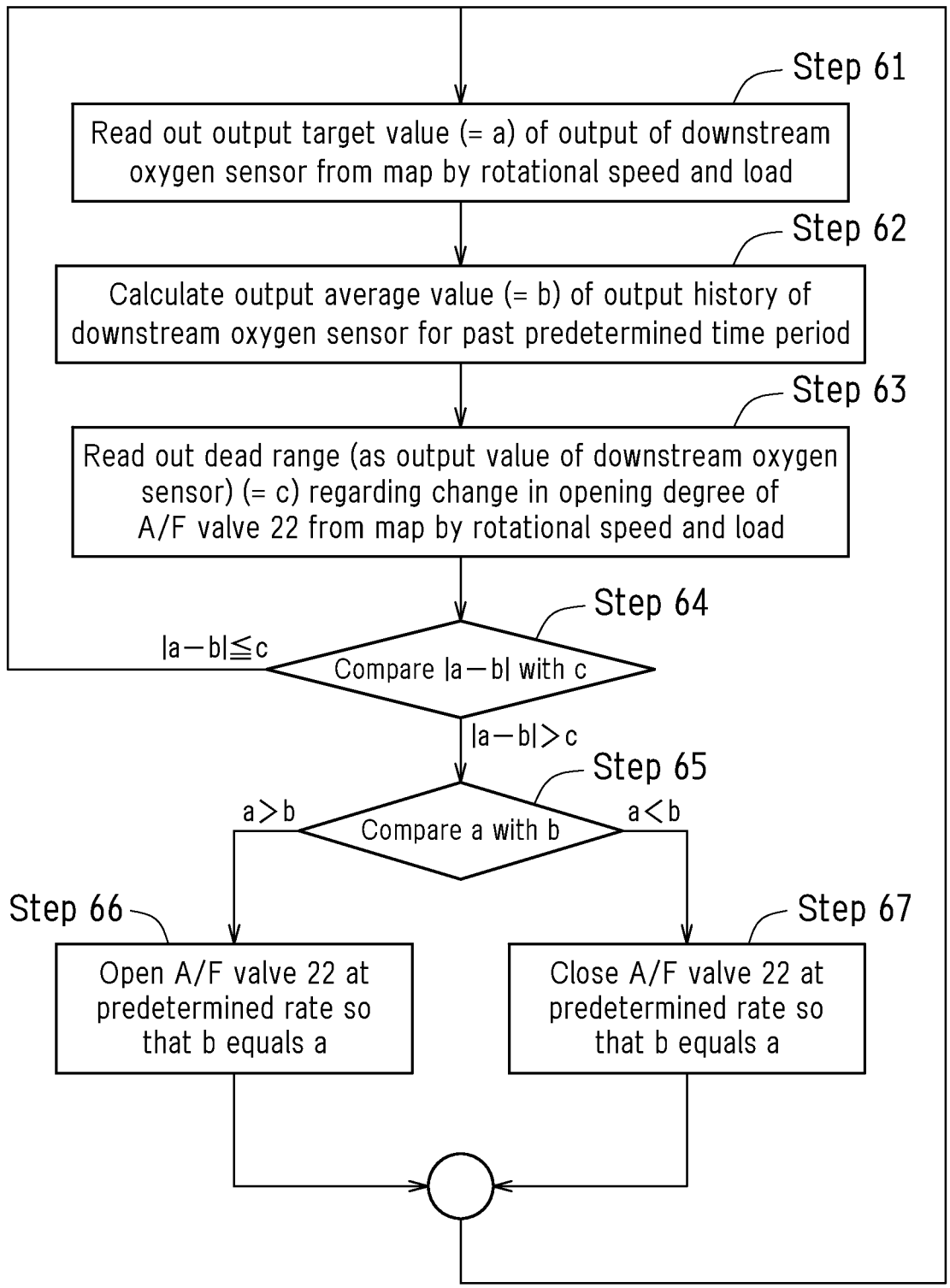
FIG. 12 is a flowchart indicating control by the control unit based on an output from the downstream oxygen sensor in consideration of changes in the calorific value of the fuel gas for the gas engine according to another embodiment of the present invention.

FIG. 12 is a flowchart indicating control by the control unit 10 to adjust the opening degree of the A/F valve 22 by comparing the output target value a with the output average value b both obtained by the downstream oxygen sensor 32. In order to assess the calorific changes in the fuel gas, the predetermined engine rotational speed and the predetermined load at the time of the stoichiometric operation are detected so as to read out the output target value a of the downstream oxygen sensor 32 that is set in the control unit 10 under the above condition (Step 61).

The output history of the downstream oxygen sensor 32 under the actual operation condition is traced back to the past from the time when the output target value a is read out so as to calculate the average value of the output history of the downstream oxygen sensor 32 for the predetermined time period to obtain the output average value b (Step 62).

The dead range c is read out from the control unit 10. The dead range c is in the period for which the engine rotational speed and the load are constant and from which the output target value a is also read out (Step 63).

If the calorific change in the fuel gas is small, the difference between the output target value a read out in Step 61 and the output average value b calculated in Step 62 should be smaller than the dead range c. Thus, the difference between the output target value a and the output average value b(|a−b|) is compared with the dead range c (Step 64).

If the difference between the output target value a and the output average value b(|a−b|) is equal to or smaller than the dead range c, the calorific change in the fuel gas is within the acceptable range. Thus, the control process from Step 61 is repeated.

If the difference between the output target value a and the output average value b(|a−b|) is larger than the dead range c, the calorific change in the fuel gas is beyond the acceptable range. Thus, the output target value a is compared with the output average value b (Step 65).

When the output average value b is smaller than the output target value a, such a fact indicates that the calorific value of the fuel gas is small by the above difference and the excess air ratio detected by the downstream oxygen sensor 32 begins to deviate to the lean side. Thus, the A/F valve 22 is opened at the predetermined rate (Step 66).

When the output average value b is larger than the output target value a, such a fact indicates that the calorific value of the fuel gas is large by the above difference and the excess air ratio detected by the downstream oxygen sensor 32 begins to deviate to the rich side. Thus, the A/F valve 22 is closed at the predetermined rate (Step 67).

After that, the control process from Step 61 is repeated.

By the control shown in FIGS. 11 and 12, when the fuel gas having the calorific value smaller or larger than that of the standard fuel gas is supplied, the gas engine 1 can handle the situation by adjusting the opening degree of the A/F valve 22, not the solenoid valve 21. Thus, in the case where the calorific value of the fuel gas remarkably changes, the gas engine 1 can address the change so as to continuously perform the perturbation control using the solenoid valve 21 in the stoichiometric operation.

Also, since the control is performed using the dead range c, it is possible to prevent the A/F valve 22 from being opened and closed too frequently in response to the difference between the output target value a and the output average value b, which results in reduction in burden placed on the control unit 10 when it processes the data. Thus, it is possible to control stably the air-fuel ratio without unintentional hunting in the air-fuel ratio.

Note that the control described above with reference to FIGS. 11 and 12 is the case where the dead range c is applied to the control shown in FIGS. 6 and 7. However, the control may also be performed by applying the dead range c to the control shown in FIGS. 9 and 10.

Figure 13:
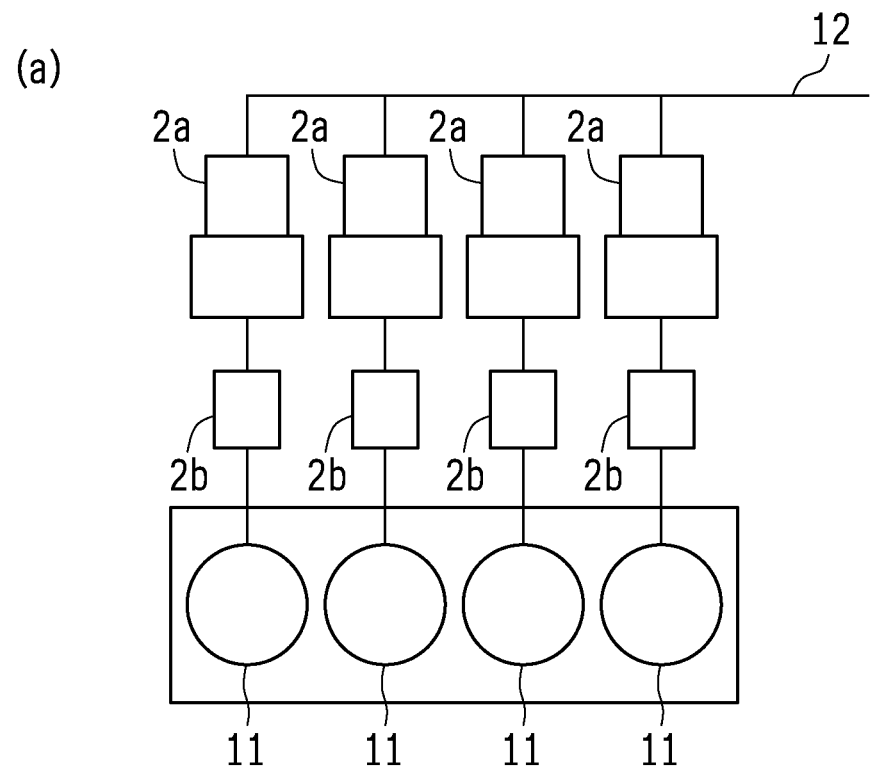
FIG. 13($a$) is a schematic diagram showing another configuration of an intake section.
Figure 13:
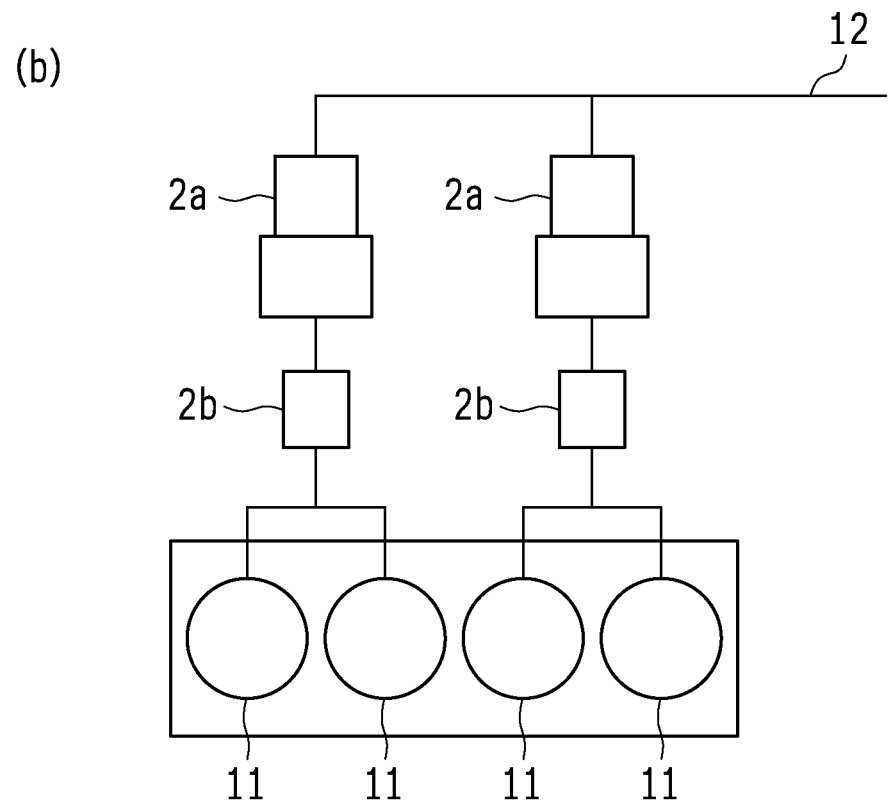

In the above-described embodiments, one mixing unit 2a is disposed on the intake passage 12. However, the mixing units 2a may each be disposed on the corresponding cylinder head 11 of the gas engine 1 as shown in FIG. 13(a), or the mixing units 2a may each be disposed on every group consisting of two or more of the cylinder heads 11 as shown in FIG. 13(b) (in FIG. 13(b), the group consists of two cylinder heads 11).

Figure 14:
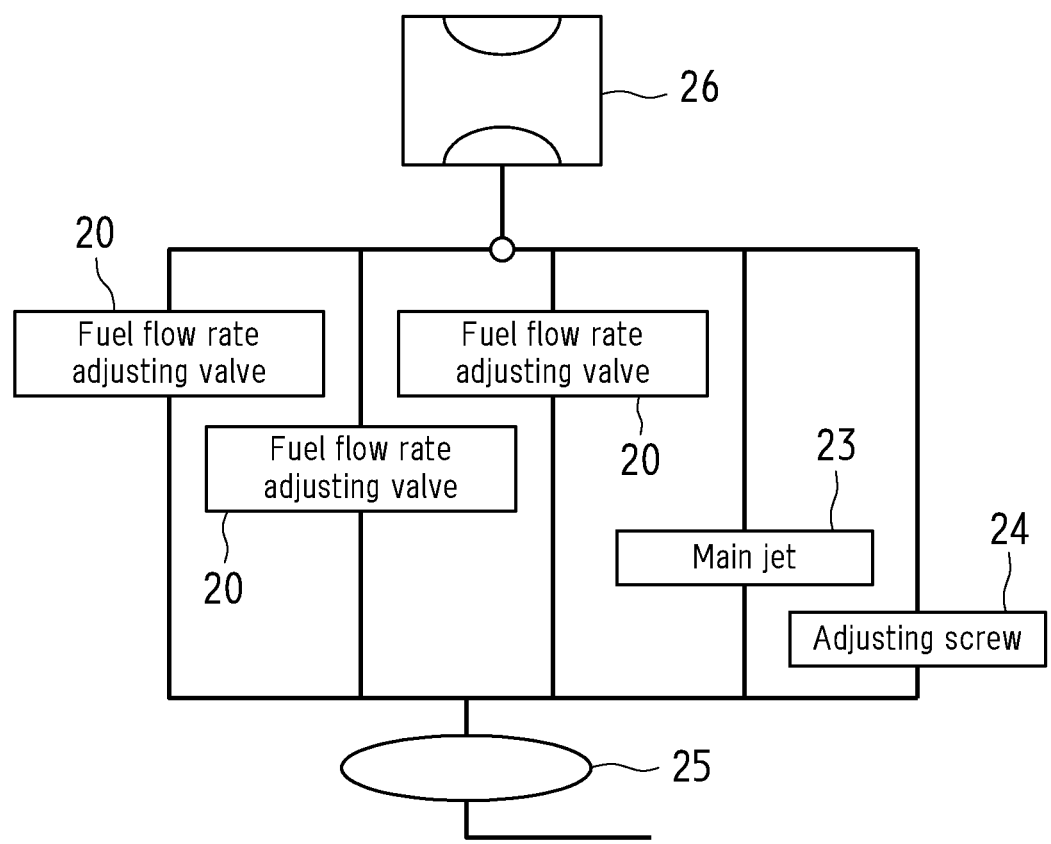
FIG. 14 is a schematic diagram showing another configuration of the mixing unit.

Also, the above-described embodiments, the mixing unit 2a is configured to control the solenoid valve 21 and the A/F valve 22 respectively having the different flow rate characteristics. However, as shown in FIG. 14, the mixing unit 2a may be configured to include and control a plurality of (specifically; two; or more than two) fuel flow rate adjusting valves 20 having the same flow rate characteristics (in FIG. 14, three fuel flow rate adjusting valves 20 are disposed). In this case, the mixing unit 2a may include the fuel flow rate adjusting valve 20 that serves as the solenoid valve 21 of the above embodiments and the fuel flow rate adjusting valve 20 that serves as the A/F valve 22 of the above embodiments. Alternatively, the mixing unit 2a may include the fuel flow rate adjusting valves 20 that respectively serve not only as the solenoid valve 21 of the above embodiments but also as the A/F valve 22 of the above embodiments. In this case, various valves, which are used to control this kind of fuel gas, may be used as the fuel flow rate adjusting valve 20. More specifically, a butterfly valve, a solenoid valve and the like may be used.

As described above, the gas engine 1 is configured to switch between the stoichiometric operation and the lean operation. However, the gas engine 1 may be configured to perform only the stoichiometric operation. Also, the gas engine 1 is configured to detect the excess air ratio in the stoichiometric operation using the upstream oxygen sensor 31. However, in place of the upstream oxygen sensor 31, a wide range oxygen sensor (not shown) may be used to detect the excess air ratio in the stoichiometric operation.

Figure 15:
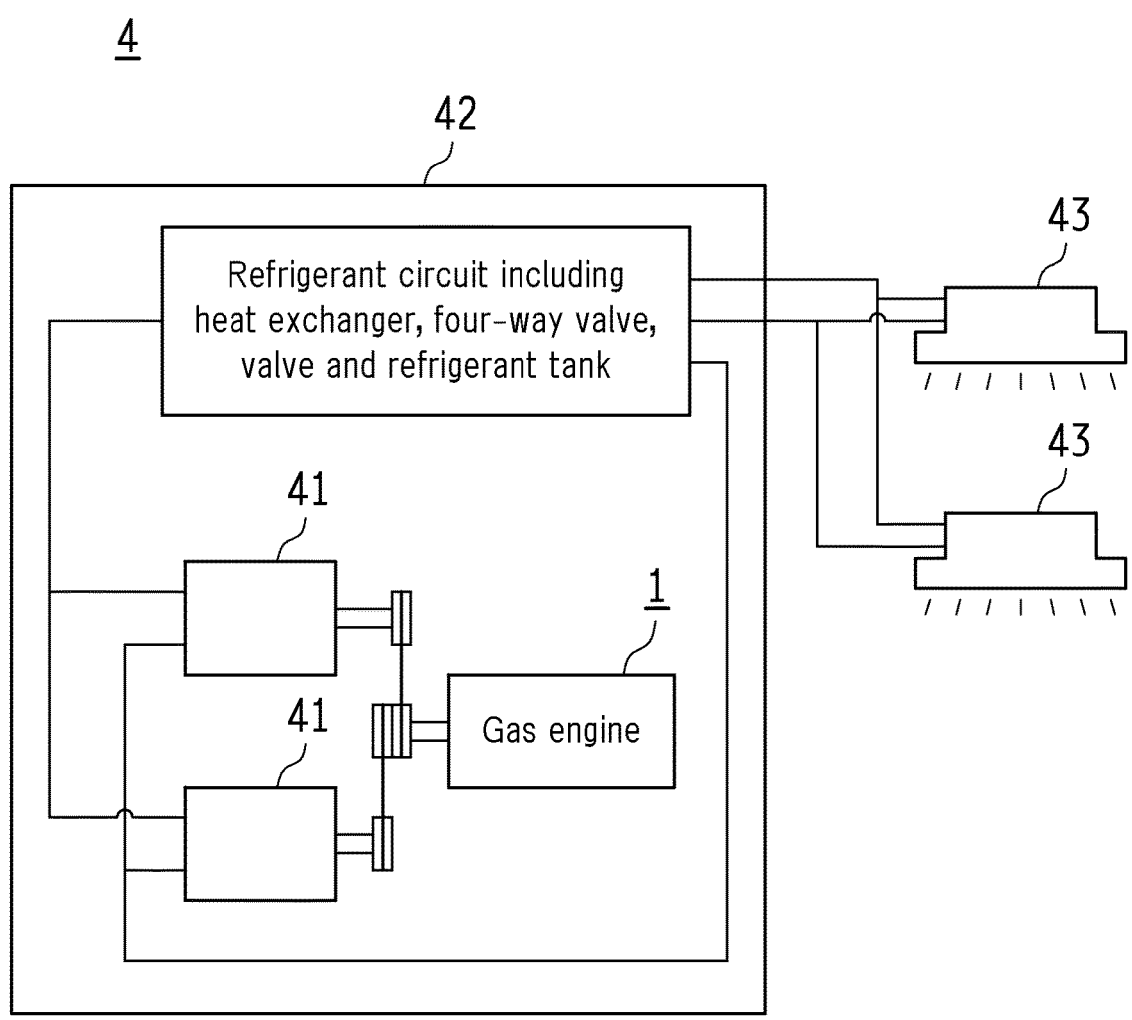
FIG. 15 is a schematic diagram showing an overall configuration of a gas heat pump system using the gas engine according to the present invention.
Figure 16:
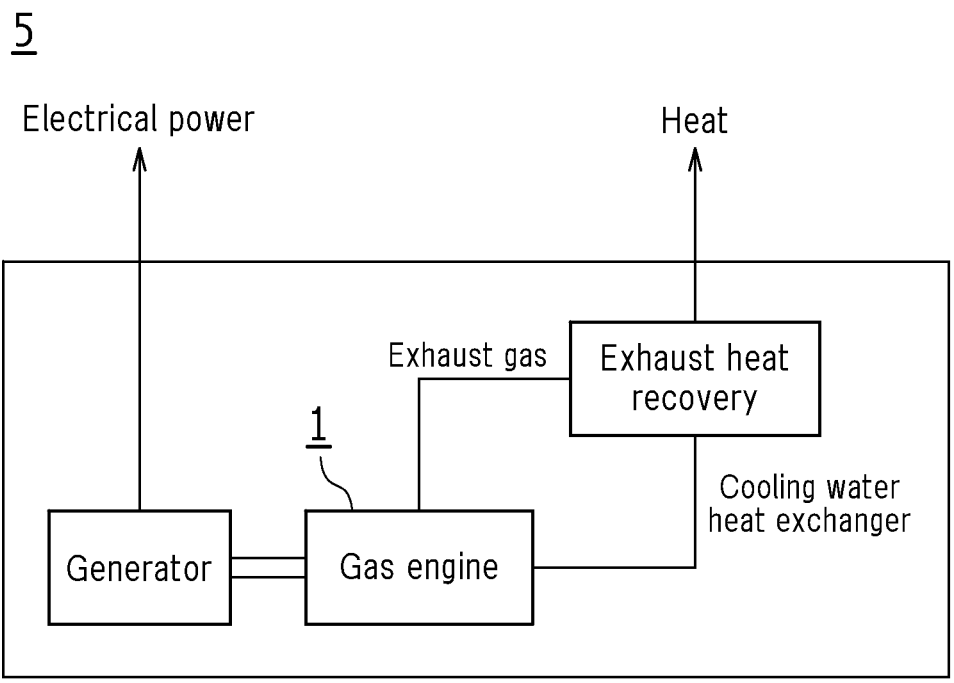
FIG. 16 is a schematic diagram showing an overall configuration of a cogeneration system using the gas engine according to the present invention.

The gas engine 1 having each of the above-described configurations can be suitably used as a drive source of a gas heat pump system 4 as shown in FIG. 15. Also, the gas engine 1 can be suitably used as a drive source of a cogeneration system 5 as shown in FIG. 16. That is, the above systems are likely to be operated for a long period of time without a stop, or likely to use a fuel gas made from biomass whose composition easily varies as the material for generating the fuel gas. Thus in the above systems, there are many factors contributing to the calorific change in the fuel gas. Therefore, the above systems can easily exert the effects of the present invention by using the gas engine 1 of the present invention that can address the calorific change in the fuel gas. In FIG. 15, the gas heat pump system 4 includes the gas engine 1 connected to two compressors 41. However, a single compressor 41 or more than two compressors 41 may be adopted. Also, in FIG. 15, the gas heat pump system 4 includes one outdoor unit 42 connected to two indoor units 43. However, a single indoor unit 43 or more than two indoor units 43 may be adopted.

Also, in the above-described embodiments, the gas engine 1 is described. However, apart from the gas engine 1, the present invention may be applied to various engines that perform the perturbation control.

The present invention may be embodied in other forms without departing from the gist or essential characteristics thereof. The foregoing embodiment is therefore to be considered in all respects as illustrative and not limiting. The scope of the invention is indicated by the appended claims rather than by the foregoing description, and all modifications and changes that come within the meaning and range of equivalency of the claims are intended to be embraced therein.

DESCRIPTION OF REFERENCE NUMERALS

1 Gas engine
10 Control unit
11 Cylinder head
13 Exhaust passage
2 Intake section
20 Fuel flow rate adjusting valve (first valve and/or second valve)
21 Solenoid valve (second valve)
22 A/F valve (first valve)
31 Upstream oxygen sensor
32 Downstream oxygen sensor
a Output target value
b Output average value

The invention claimed is:

1. A fuel gas engine comprising:
a first valve and a second valve provided in parallel on a supply path of fuel gas, the first valve having a responsiveness being lower and a fuel flow rate adjustment range being wider than the second valve, the second valve having a responsiveness being higher and a fuel flow rate adjustment range being narrower than the first valve; and
an electronic control unit coupled to a memory and to an oxygen sensor, the first valve and the second valve, the electronic control unit configured to perform processing operations comprising perturbation control using the second valve at a time of stoichiometric operation by moving the second valve from a predetermined opening degree to a lean side where the opening degree becomes smaller and a rich side where the opening degree becomes larger alternatively at a predetermined pitch in a state where the first valve is opened at a predetermined opening degree;
wherein, in a period in which an operation condition of the fuel gas engine is deemed to be stable under the perturbation control of the second valve at a predetermined engine rotational speed with a predetermined load, when an average value of outputs obtained from the oxygen sensor disposed on an exhaust passage of the fuel gas engine deviates from an output target value of the oxygen sensor, the output target value being set in the electronic control unit for the operation condition, the electronic control unit adjusts an opening degree of the first valve in such a manner that the output average value equals the output target value; and
wherein the electronic control unit is configured to perform processing operations further comprising calculating the output average value by extracting a maximum output and a minimum output of the oxygen sensor respectively corresponding a maximum opening degree and a minimum opening degree in the perturbation control by the second valve in the period.

2. The fuel gas engine according to claim 1, wherein the electronic control unit is configured to perform processing operations further comprising adjusting the opening degree of the first valve so that the output average value converges into the output target value with a certain range.

3. The fuel gas engine according to claim 1, wherein the electronic control unit is configured to perform processing operations further comprising adjusting the opening degree of the first valve so that the output average value converges into the output target value with a certain range.

4. The fuel gas engine according to claim 1, wherein the first valve and the second valve are disposed with respect to each cylinder head or with respect to a group of cylinder heads.

5. The fuel gas engine according to claim 1, wherein the first valve comprises a plurality of first valves and the second valve comprises a plurality of second valves.

6. The fuel gas engine according to claim 1, wherein the oxygen sensor comprises an upstream oxygen sensor disposed on an upstream side of the exhaust passage relative to a catalyst.

7. The fuel gas engine according to claim 1, wherein the oxygen sensor comprises a downstream oxygen sensor disposed on a downstream side of the exhaust passage relative to a catalyst.

8. A gas heat pump system including the fuel gas engine according to claim 1 as a drive source.

9. A cogeneration system including the fuel gas engine according to claim 1 as a drive source.

10. The fuel gas engine according to claim 1, further comprising:
 a mixer downstream of the first valve and the second valve;
 a throttle valve positioned downstream of the mixer; and
 an air intake passage of the fuel gas engine, the throttle valve positioned between the mixer and the air intake passage.

11. The fuel gas engine according to claim 1, wherein the electronic control unit is configured to obtain a dead range.

12. The fuel gas engine according to claim 11, wherein, in the period in which the operation condition of the fuel gas engine is deemed to be stable under the perturbation control of the second valve at the predetermined engine rotational speed with the predetermined load, the electronic control unit is configured to:
 determine a difference between the average value of outputs and the output target value; and
 determine whether the difference is included in the dead range.

13. The fuel gas engine according to claim 11, wherein, in the period in which the operation condition of the fuel gas engine is deemed to be stable under the perturbation control of the second valve at the predetermined engine rotational speed with the predetermined load, the electronic control unit is configured to:
 determine a difference between the average value of outputs and the output target value; and
 determine whether the difference is not included in the dead range.

14. The fuel gas engine according to claim 11, wherein the electronic control unit is configured to adjust the opening degree of the first valve based on a comparison between the dead range and a difference between the average value of outputs and the output target value.

15. The fuel gas engine according to claim 14, wherein the electronic control unit is configured to increase the opening degree of the first valve based on an absolute value of the difference between the average value of outputs and the output target value being greater than the dead range.

* * * * *